US006535609B1

(12) United States Patent

Finn et al.

(10) Patent No.: US 6,535,609 B1
(45) Date of Patent: Mar. 18, 2003

(54) CABIN COMMUNICATION SYSTEM

(75) Inventors: Alan M. Finn, Amston, CT (US); Gonzalo J. Rey, Glastonbury, CT (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 08/868,212

(22) Filed: Jun. 3, 1997

(51) Int. Cl.$^{7}$ .......................... H04B 1/00; H04B 15/00; H04R 3/00; H04M 9/08

(52) U.S. Cl. ............................ 381/86; 381/93; 381/92; 379/406.01

(58) Field of Search ........................ 381/66, 97.1, 94.1, 381/92, 83, 318, 86, 93; 379/406, 410

(56) References Cited

U.S. PATENT DOCUMENTS 4,131,760 A * 12/1978 Christensen et al. .......... 381/66
4,536,887 A 8/1985 Kaneda et al.
4,747,132 A 5/1988 Ibaraki et al.
4,817,160 A * 3/1989 De Koning et al.
4,965,833 A * 10/1990 McGregor
5,201,006 A * 4/1993 Weinrich
5,245,665 A 9/1993 Lewis et al.
5,276,739 A * 1/1994 Kokstad et al.
5,384,843 A * 1/1995 Masuda et al.
5,602,928 A 2/1997 Eriksson et al.
5,647,006 A * 7/1997 Martin ........................ 381/66
5,706,344 A 1/1998 Finn
5,768,473 A 6/1998 Eatwell et al.
5,774,562 A * 6/1998 Furuya et al. ................ 381/66

FOREIGN PATENT DOCUMENTS

EP 0453293 A 10/1991
EP 0599450 A 6/1994
JP 59064995 4/1984

* cited by examiner

*Primary Examiner*—Forester W. Isen
*Assistant Examiner*—Brian T. Pendleton
(74) *Attorney, Agent, or Firm*—Niro, Scavone, Haller & Niro

(57) ABSTRACT

The present invention teaches a system for improving the clarity of a voice spoken within an enclosed space. The system comprises a first microphone, positioned at a first location, for receiving the audible communication and for converting the audible communication at the first location into a first audio signal. The system also comprises a loudspeaker for receiving the first audio signal, and for converting the first audio signal into a first reproduced audible communication, the reproduced audible communication also being fed back and received by the first microphone and converted with the audible communication into the first audio signal. Moreover, the system comprises an acoustic echo cancellation system for determining the relationship between the received audible communication by the first microphone and the first audio signal comprising both the audible communication and the reproduced audible communication fed back to the first microphone, and for removing the first reproduced audible communication fed back to the first microphone from the first audio signal received by the loudspeaker.

15 Claims, 2 Drawing Sheets

FIG. 1
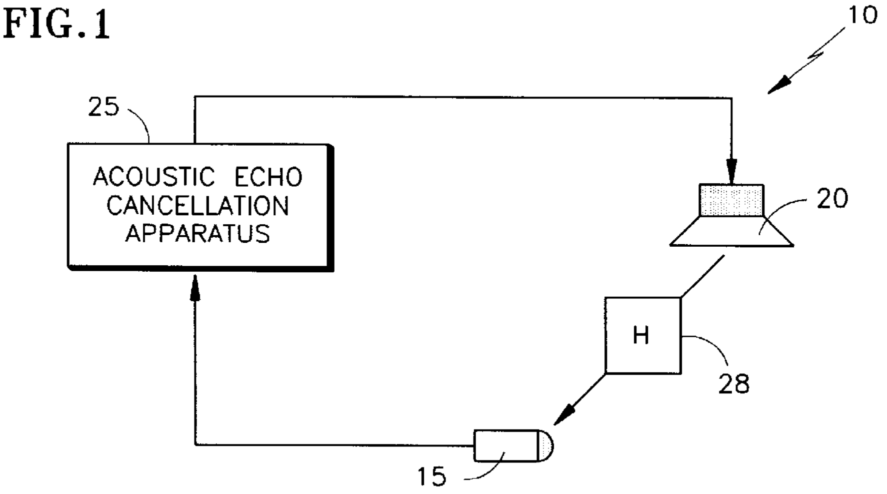
FIG. 2
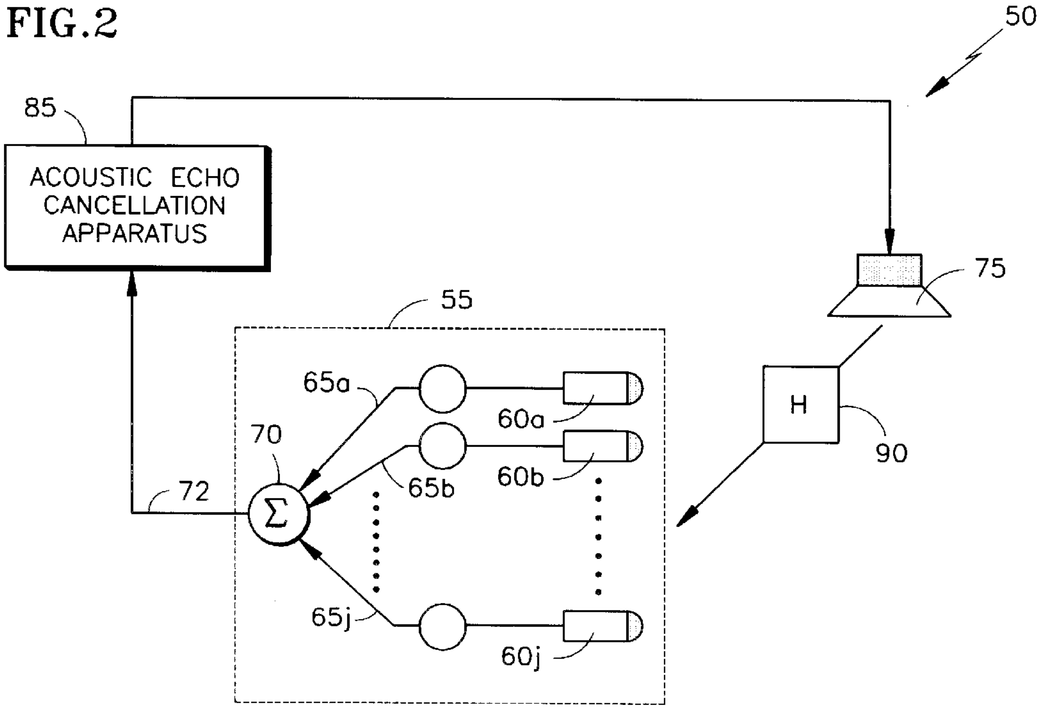
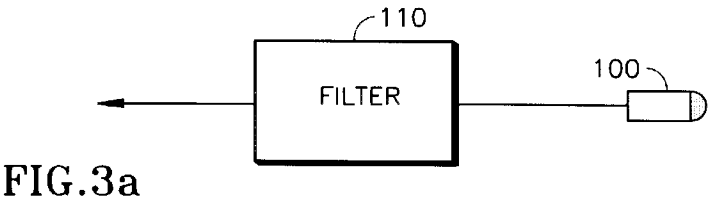
FIG. 3a

CABIN COMMUNICATION SYSTEM

FIELD OF THE INVENTION

This invention relates to communication systems, generally, and more particularly to a communication system for the interior cabin of a vehicle such as an automobile.

BACKGROUND OF THE INVENTION

It is well established that audible communications by speakers in an enclosed interior may pose challenges to listeners. The primary cause of these problems are the acoustics inherent to the interior and ambient noise present within the interior. This is of particular relevance wherein the enclosed interior is an automobile, truck, airplane or helicopter.

Methods for overcoming the limitations of an interior's acoustics and ambient noise issues are also known. One known solution proposes the use of a microphone and speaker as a means for amplifying the original audible communication to overcome the acoustical and ambient noise limitations associated with an automobile interior, for example. However, such a design creates positive feedback and ringing, degrading the sound quality.

Thus, industry requires a cabin interior communication system which reduces the effects of ambient noise and the acoustical characteristics of the cabin, as well as lessens the impact of positive feedback and ringing created by a microphone loudspeaker configuration.

SUMMARY OF THE INVENTION

The primary advantage of the present invention is to overcome the limitations of the prior art.

A further advantage of the present invention is to provide a cabin interior communication system which reduces the effects of the acoustical characteristics of the cabin, as well as lessens the impact of positive feedback and ringing created by a microphone loudspeaker configuration.

In order to achieve the advantages of the present invention, a system for improving the clarity of a audible communication within an enclosed space is disclosed. The system comprises a first microphone, positioned at a first location, for receiving the audible communication and for converting the audible communication at the first location into a first audio signal. The system also comprises a loudspeaker for receiving the first audio signal, and for converting the first audio signal into a first reproduced audible communication, the reproduced audible communication also being fed back and received by the first microphone and converted with the audible communication into the first audio signal. Moreover, the system comprises an acoustic echo cancellation system for determining the relationship between the received audible communication by the first microphone and the first audio signal comprising both the audible communication and the reproduced audible communication fed back to the first microphone, and for removing the first reproduced audible communication fed back to the first microphone from the first audio signal received by the loudspeaker.

In a further embodiment of the present invention, a communication system is disclosed for improving the clarity of a voice spoken within an interior cabin having ambient noise and cabin acoustics. The system comprises a first microphone, at a first location, for receiving the spoken voice and for converting the spoken voice at the first location into a first audio signal, and a second microphone, at a second location, for receiving the spoken voice, and for converting the spoken voice into a second audio signal. The also comprises a loudspeaker for receiving the first and second audio signals, for converting the first audio signal into a first reproduced spoken voice, the first reproduced spoken voice also being fed back and received by the first and second microphones and converted with the spoken voice into the first and second audio signals, and for converting the second audio signal into a second reproduced spoken voice, the second reproduced spoken voice also being fed back and received by the first and second microphones and converted with the spoken voice into the first and second audio signals. Moreover, the system comprises an acoustic echo cancellation system for determining the relationship between the received spoken voice by the first microphone and the first audio signal comprising the spoken voice and the first and second reproduced spoken voice fed back to the first microphone, for removing the first and second reproduced spoken voice fed back to the first microphone from the first audio signal received by the loudspeaker, for determining the relationship between the received spoken voice by the second microphone and the second audio signal comprising the spoken voice and the first and second reproduced spoken voice fed back to the second microphone, and for removing the first and second reproduced spoken voice fed back to the first microphone from the first audio signal received by the loudspeaker.

In still another embodiment of the present invention, a cabin communication system is disclosed for improving the clarity of a voice spoken within an interior cabin having ambient noise and cabin acoustics. The cabin communication system comprises a beamformed phased array having a first microphone, at a first location, for receiving the spoken voice and for converting the spoken voice at the first location into a first audio signal, a second microphone, at a second location, for receiving the spoken voice, and for converting the spoken voice into a second audio signal, a time delay device for compensating for a delay between the first microphone receiving the spoken voice at the first location and the second microphone receiving the spoken voice at the second location, as well as a weighting device for compensating for differences in volume between the first microphone receiving the spoken voice at the first location and the second microphone receiving the spoken voice at the second location. The system also comprises a loudspeaker for receiving the first and second audio signals, for converting the first audio signal into a first reproduced spoken voice, the first reproduced spoken voice also being fed back and received by the first and second microphones and converted with the spoken voice into the first and second audio signals, and for converting the second audio signal into a second reproduced spoken voice, the second reproduced spoken voice also being fed back and received by the first and second microphones and converted with the spoken voice into the first and second audio signals. Moreover, the system comprises an acoustic echo cancellation system for determining the relationship between the received spoken voice by the first microphone and the first audio signal comprising the spoken voice and the first and second reproduced spoken voice fed back to the first microphone, for removing the first and second reproduced spoken voice fed back to the first microphone from the first audio signal received by the loudspeaker, for determining the relationship between the received spoken voice by the second microphone and the second audio signal comprising the spoken voice and the first and second reproduced spoken voice fed back to the second microphone, and for removing the first and second reproduced spoken voice fed back to the first microphone from the first audio signal received by the loudspeaker.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below:

FIG. 1 illustrates a first embodiment of the present invention;

FIG. 2 illustrates the preferred embodiment of the present invention; and

Figure 3B:
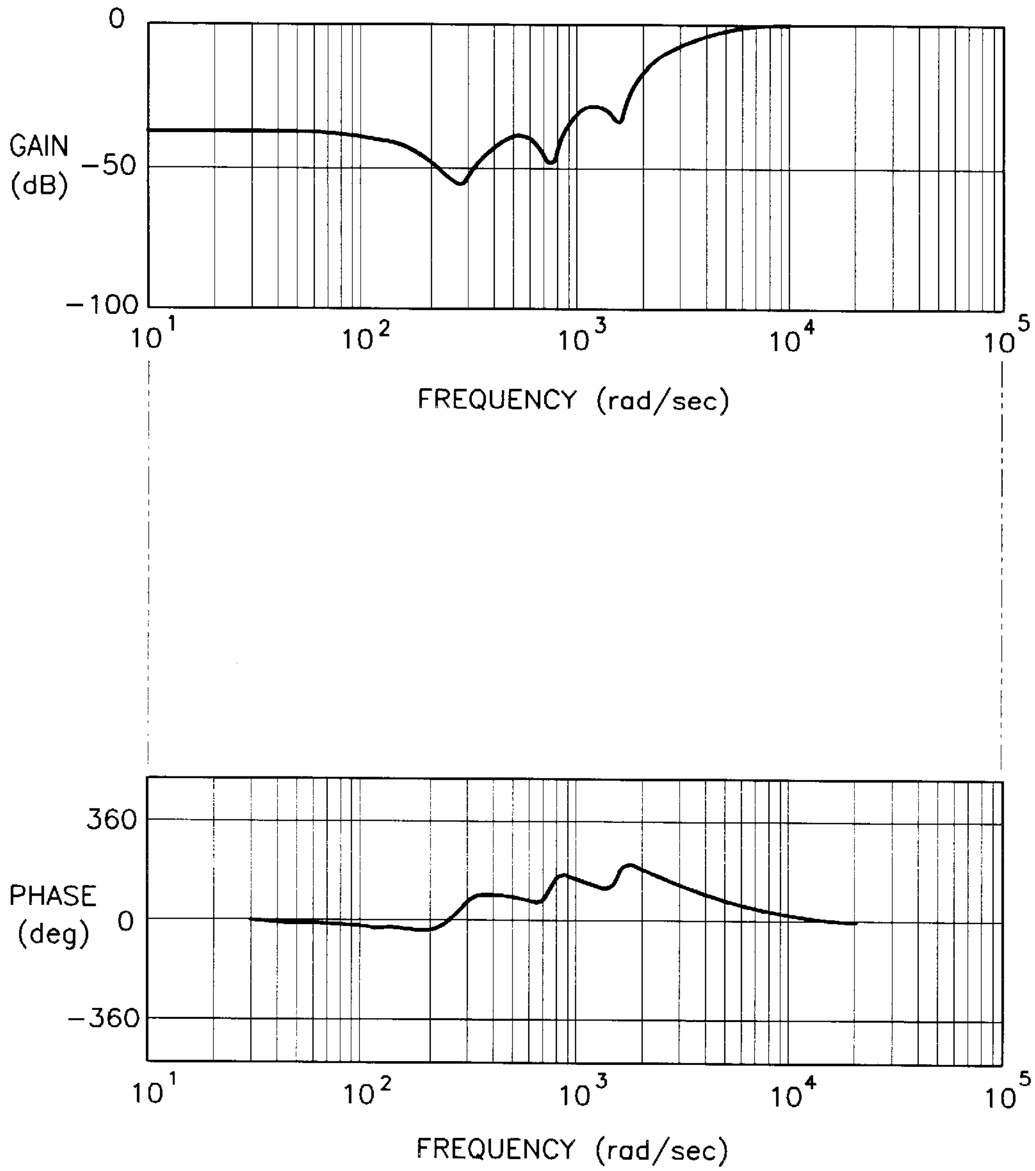
FIGS. 3(*a*) and 3(*b*) illustrate a first aspect and a first realization of the present.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE PREFERRED EMBODIMENT

Referring to FIG. 1, a communication system 10 for improving the clarity of an audible communication within an enclosed space utilizing is illustrated. In the preferred embodiment, the enclosed space is realized by an interior cabin having ambient noise and cabin acoustics such as characteristic within the interior of an automobile, truck, airplane or helicopter.

Communication system 10 comprises a microphone 15. Positioned at first location within the cabin, microphone 15 receives the audible communication which is unique to the coordinates of the first position. Audible communication is defined as all forms of communication emanating from the party communicating within the audible range of the human ear. As a result of receiving the audible communication, microphone 15 converts the acoustical energy of the audible communication into an electrical signal, generally, and more specifically, a first audio signal.

Moreover, system 10 also comprises a loudspeaker 20 for converting electrical signals as represented by the first audio signal to acoustical energy. In so doing, a reproduced version of the original the audible communication is created from the first audio signal. Loudspeaker 20 is coupled with first microphone 15 in order to receive the first audio signal.

Given the above arrangement, however, it should be apparent to one of ordinary skill in the art, that the reproduced version of the original the audible communication will inherently be fed back into the microphone 15. As such, the reproduced audible communication will be subsequently converted with the original audible communication into the first audio signal.

The distortion associated with the reproduced version of the original the audible communication fed back to microphone 15 fundamentally diminishes the quality, clarity and understanding of the audible communication, particularly when a listener is the rear seat of an automobile and the speaker is positioned in the front seat.

To improve the characteristics of the reproduced audible communication, system 10 additionally comprises an acoustic echo cancellation apparatus 25. Apparatus 25 functionally determines the relationship between the audible communication as received by microphone 15 and the first audio signal which includes both the audible communication as converted by microphone 15 and the reproduced version of the original audible communication by the loudspeaker 20. Once the transfer function (as illustrated by icon 28) is ascertained, apparatus 25 subsequently removes the received feed back signals from the first audio signal transmitted to loudspeaker 20. To realize this benefit, apparatus 25 is coupled between microphone 15 and loudspeaker 20.

Referring to FIG. 2, the preferred design of a communication system 50 for improving the clarity of an audible communication within an interior cabin is depicted. Here, system 50 comprises a plurality of microphones, 60*a*, 60*b*, . . . 60*j*, each for receiving the audible communication. In the preferred embodiment, the plurality of microphones, 60*a*, 60*b*, . . . 60*j*, are combined to form a phased array. The phased array in this configuration is preferably formed by beamforming each of the microphones.

Each microphone of the phased array 55 further receives the audible communication relative to the unique coordinates and the positions of each microphone of the plurality. As a result of each microphone of the phased array receiving the audible communication, microphones 60*a*, 60*b*, . . . 60*j* individually convert the acoustical energy of the audible communication into electrical signals, generally, and more specifically, audio signals, 65*a*, 65*b* . . . 65*j*. Utilizing an summing amplifier 70, audio signals, 65*a*, 65*b* . . . 65*j*, are combined together to a form a resultant audio signal 72. It shall be generally understood by one of ordinary skill in the art that summing amplifier 70 is realized by a simple beamformed phased-array.

System 50 further comprises a loudspeaker 75 for converting electrical signals as represented by the resultant audio signal 72 to acoustical energy. By this arrangement, a reproduced version of the original audible communication is recreated from the resultant audio signal 72. Loudspeaker 75 is coupled with each microphone of phased array 55 through amplifier 70 in order to receive the resultant audio signal 72.

Given the above arrangement, however, it should be apparent to one of ordinary skill in the art that the reproduced version of the original the audible communication will inherently be fed back into each microphone of the phased array 55. As such, the reproduced audible communication will be subsequently converted with the original audible communication into audio signals, 65*a*, 65*b* . . . 65*j*, and as such, the resultant audio signal 72.

The distortion associated with the reproduced version of the original audible communication fed back to each microphone of the phased array 55 fundamentally diminishes the quality, clarity and understanding of the audible communication. This is particularly true when a listener is the rear seat of an automobile and the speaker is positioned in the front seat.

To improve the characteristics of the reproduced audible communication, system 50 additionally comprises an acoustic echo cancellation apparatus 85. Apparatus 85 functionally determines the relationship between the audible communication as received by the phased array 55 and the resultant audio signal 72 which includes both the audible communication as converted by each microphone 60*a*, 60*b*, . . . 60*j* and the reproduced version of the original audible communication by the loudspeaker 75. Once the transfer function (as illustrated by icon 90) is ascertained, apparatus 85 subsequently removes the received feed back signal from the resultant audio signal 72 transmitted to loudspeaker 20. To realize this benefit, apparatus 85 is coupled between the phased array 55 and loudspeaker 75.

It should be noted that in an alternate embodiment of the present invention, system 50 additionally comprises a filtering device (not shown). The filtering device, coupled with each microphone of phased array 55 and amplifier 70, compensates for the delays, changes in volume, and other acoustic effects between the first microphone of the phased array 55 receiving the audible communication at the first location and the subsequent microphones which receive the audible communication at their specific locations. In so doing, the resultant audio signal reflects the unique perspective of each microphone of the phased array 55 at the same point in time.

The filtering device of system 50 preferably comprises time delay devices with multiplicative weights. The weighting of the times delay devices may be fixed for a given application. Alternately, the weighting of the times delay devices may be adaptive to the specific acoustic environment.

Moreover, it should be further noted that in still a further embodiment, phased array 55 also comprises a weighting device (not shown). To compensate for differences in audio volume between the first microphone of the phased array receiving the audible communication at the first location and the subsequent microphones which receive the audible communication at their specific locations, the weighting device is incorporated. The weighting device may be realized by an audio compressor. Much like the time delay system, the weighting device is coupled with coupled with each microphone of the phased array and amplifier 70.

Referring to FIGS. 3(*a*) and 3(*b*), a first aspect and a first realization of an additional feature of the present invention is illustrated. Cabin interiors are known for having ambient noise, as well as known acoustical characteristics. To compensate for the ambient noise and the known acoustical characteristics of the interior cabin on the reproduced version of the original audible communication by the loudspeaker, microphone 100 is coupled directly with a filter 110. Alternately, filter 110 may also be coupled with the loudspeaker functionally responsible for reproducing the original audible communication from an audio signal or signals input thereto.

Filter 110 may be realized utilizing several designs, such as a high pass filter having notches. One such filter is reflected in the transfer function characteristics illustrated in FIG. 3(*b*). In another scheme, filter 110 may also be realized by an adaptive line enhancer, as well as others adaptive speech filter apparent to one of ordinary skill in the art.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, for example, it should be apparent to one of ordinary skill in the art that while a phased array multi-microphone design having a singular loudspeaker is detailed, such a system may also employ a plurality of loudspeakers and a plurality or phased array multi-microphones each requiring an acoustic cancellation apparatus to remove the echo created by the microphone feedback. It is therefore contemplated that the appended.. claims will cover any such modifications or embodiments as fall within the true scope of the invention.

What is claimed is:

1. A cabin communication system for improving clarity of a voice spoken within an interior cabin having ambient noise and cabin acoustics, said cabin communication system comprising:

a first microphone, positioned at a first location within the cabin, for receiving the spoken voice and for converting the spoken voice into a first audio signal;

a second microphone, positioned at a second location within the cabin, for receiving the spoken voice and for converting the spoken voice into a second audio signal;

a filtering device for providing first and second filtered audio signals responsive to said first and second audio signals, said first and second filtered audio signals being compensated for a difference between a first voice volume as indicated by said first audio signal and a second voice volume as indicated by said second audio signal;

a summer for summing said first and second compensated audio signals to provide a resultant audio signal that is indicative of a detection location within the cabin relative to the first and second locations of said first and second microphones;

an acoustic echo cancellation device for receiving said resultant audio signal and for outputting an echo-canceled audio signal; and a loudspeaker for converting said echo-canceled audio signal into an output reproduced voice within the cabin, wherein said loudspeaker and said first and second microphones are acoustically coupled so that said output reproduced voice is fed back from said loudspeaker to be received by said first and second microphones and converted as a component with the spoken voice that is additive to said first and second audio signals, and wherein said acoustic echo cancellation device removes said component from said first and second audio signals.

2. The cabin communication system of claim 1, wherein said first and second microphones define a beamformed phase array.

3. The cabin communication system of claim 1, wherein said filtering device applies a delay to at least one of said first and second audio signals such that said first and second microphones function as a beamformed phase array.

4. The cabin communication system of claim 1, further comprising a filter for removing the ambient noise and cabin acoustics from said first and second audio signals.

5. The cabin communication system of claim 1, wherein said filter comprises at least one of a high pass filter having notches for acoustic modes and an adaptive speech enhancer.

6. The cabin communication system of claim 1, wherein said filtering device comprises a weighting device for applying weights to compensate for the difference between the first volume and the second volume.

7. The cabin communication system of claim 6, wherein said weighting device comprises an audio compressor.

8. A movable vehicle cabin having ambient noise and cabin acoustics, said cabin comprising:

means for causing movement of said cabin, wherein at least a portion of the ambient noise during the movement is a result of the movement; and a communication system for improving clarity of a voice spoken within an interior of said cabin, wherein said cabin communication system comprises:

a first microphone, positioned at a first location within said cabin, for receiving the spoken voice and for converting the spoken voice into a first audio signal;

a second microphone, positioned at a second location within said cabin, for receiving the spoken voice and for converting the spoken voice into a second audio signal;

a summer for summing said first and second audio signals to provide a resultant audio signal that is indicative of a detection location within the cabin relative to the first and second locations of said first and second microphones;

an acoustic echo cancellation device for receiving said resultant audio signal and for outputting an echo-canceled audio signal; and a loudspeaker for converting said echo-canceled audio signal into an output reproduced voice within said cabin, wherein said loudspeaker and said first and second microphones are acoustically coupled so that said output reproduced voice is fed back from said loudspeaker to be received by said first and second microphones and converted as a component with the spoken voice that is additive to said first and second audio signals, and wherein said acoustic echo cancellation device removes said component from said first and second audio signals.

9. The cabin of claim 8, wherein said first and second microphones define a beamformed phase array.

10. The cabin of claim 8, further comprising a filtering device responsive to said first and second audio signals to provide first and second filtered audio signals, said first and second filtered audio signals being compensated for a difference between a first voice volume as indicated by said first audio signal and a second voice volume as indicated by said second audio signal, wherein said summer sums said first and second filtered audio signals to provide said resultant audio signal.

11. The cabin of claim 10, wherein said filtering device applies a delay to at least one of said first and second audio signals such that said first and second microphones function as a beamformed phase array.

12. The cabin of claim 8, wherein said cabin communication system further comprises a filter for removing the ambient noise and cabin acoustics from said first and second audio signals.

13. The cabin of claim 12, wherein said filter comprises at least one of a high pass filter having notches for acoustic modes and an adaptive speech enhancer.

14. The cabin of claim 8, wherein said filtering device comprises a weighting device for applying weights to compensate for the difference between the first volume and the second volume.

15. The cabin of claim 14, wherein said weighting device comprises an audio compressor.

* * * * *